United States Patent
Ye et al.

(10) Patent No.: US 12,556,433 B2
(45) Date of Patent: Feb. 17, 2026

(54) CHANNEL AND NOISE ESTIMATION IN WIRELESS COMMUNICATION

(71) Applicant: TP-LINK SYSTEMS, INC., Irvine, CA (US)

(72) Inventors: Qiaoyang Ye, San Jose, CA (US); Jian Gu, San Jose, CA (US)

(73) Assignee: TP-LINK SYSTEMS, INC., Irvine, CA (US)

( * ) Notice: Subject to any disclaimer, the term of this patent is extended or adjusted under 35 U.S.C. 154(b) by 0 days.

(21) Appl. No.: 18/790,649

(22) Filed: Jul. 31, 2024

(65) Prior Publication Data

US 2026/0039510 A1    Feb. 5, 2026

(51) Int. Cl.
*H04L 25/02* (2006.01)
*H04L 5/00* (2006.01)
*H04L 25/03* (2006.01)

(52) U.S. Cl.
CPC ........ *H04L 25/0204* (2013.01); *H04L 5/0007* (2013.01); *H04L 25/03299* (2013.01)

(58) Field of Classification Search
CPC .............. H04L 25/0204; H04L 5/0007; H04L 25/03299
See application file for complete search history.

(56) References Cited

U.S. PATENT DOCUMENTS

2015/0036650 A1*  2/2015  Shen ................... H04L 25/0204
                                                        370/330

* cited by examiner

Primary Examiner — Rahel Guarino
(74) Attorney, Agent, or Firm — Evergrow Law LLP (57) ABSTRACT

In some embodiments, an receiver in wireless communication may determine whether channel smoothing should be used in channel and noise estimation. The receiver may obtain pre-smoothing channel estimation using one or more training symbols in a digital wireless frame, and obtain post-smoothing channel estimation by performing smoothing operation over the pre-smoothing channel estimation. The receiver may obtain pre-smoothing estimated noise using the one or more training symbols, and obtain post-smoothing estimated noise based on the post-smoothing channel estimation. The receiver may compare the pre-smoothing estimated noise and the post-smoothing estimated noise. If the post-smoothing estimated noise has a noise power no larger than the pre-smoothing estimated noise power or a weighted pre-smoothing estimated noise power, where the weight can be predefined or configured, post-smoothing channel and noise estimation may be used. Otherwise, pre-smoothing channel and noise estimation may be used. The receiver may be an orthogonal frequency-division multiplexing (OFDM) receiver.

20 Claims, 4 Drawing Sheets

CHANNEL AND NOISE ESTIMATION IN WIRELESS COMMUNICATION

FIELD

This technology relates to wireless communication network, and more particularly to apparatuses and methods for channel and noise estimation.

BACKGROUND

Wireless local area network (WLAN) protocols, such as Institute for Electrical and Electronics Engineers (IEEE) 802.11, allow for various devices (stations) to communicate with each other in a wireless communication network. Whereas the protocols specify the signaling in over the air (OTA) medium, many underlying implementation details in devices are left to the device manufacturers. For example, a receiver device may implement channel and noise estimation in physical (PHY) layer when decoding data received from the OTA medium.

SUMMARY

The present disclosure relates to techniques for optimizing the performance of channel estimation and noise estimation in decoding signals from a wireless frame in wireless communication. In an embodiment, the techniques provide an apparatus for channel and noise estimation that includes: a channel estimator configured to provide first estimated channels based on one or more training symbols received from a wireless channel; a channel smoother coupled to the channel estimator and configured to smooth the first estimated channels to provide second estimated channels; a first noise estimator configured to provide first estimated noise based on the one or more training symbols; a second noise estimator coupled to the channel smoother and configured to provide second estimated noise based on the second estimated channels; a multiplexer configured to, in response to a selection signal, select estimated channels and estimated noise respectively from the first estimated channels and the first estimated noise or respectively from the second estimated channels and the second estimated noise; and a decoder configured to decode wireless signals from the wireless channel using the selected estimated channels and the selected estimated noise.

In an embodiment, the techniques provide a method for channel and noise estimation that includes: providing first estimated channels based on one or more training symbols received from a wireless channel; smoothing the first estimated channels to provide second estimated channels; providing first estimated noise based on the one or more training symbols; providing second estimated noise based on the second estimated channels; in response to a selection signal, selecting estimated channels and estimated noise respectively from the first estimated channels and the first estimated noise or respectively from the second estimated channels and the second estimated noise; and decoding wireless signals from the wireless channel using the selected estimated channels and the selected estimated noise.

In an embodiment, the techniques provide an orthogonal frequency-division multiplexing (OFDM) receiver in wireless communication, in which signals are encoded on multiple subcarriers each associated with a respective carrier frequency. The receiver includes: an radio frequency (RF) unit configured to receive an RF signal from an over the air medium on the multiple subcarriers; an analog-to-digital (AD) converter configured to convert the received RF signal to a digital wireless frame; a channel estimator configured to provide first estimated channels based on one or more training symbols contained in the digital wireless frame; a channel smoother configured to smooth the first estimated channels to provide second estimated channels; a first noise estimator configured to provide first estimated noise based on the one or more training symbols; a second noise estimator configured to provide second estimated noise based on the second estimated channels; a multiplexer configured to, in response to a selection signal, select estimated channels and estimated noise respectively from the first estimated channels and the first estimated noise or respectively from the second estimated channels and the second estimated noise; and a decoder configured to decode the digital wireless frame using the selected estimated channels and the selected estimated noise.

BRIEF DESCRIPTION OF DRAWINGS

Additional embodiments of the disclosure, as well as features and advantages thereof, will become more apparent by reference to the description herein taken in conjunction with the accompanying drawings. The components in the figures are not necessarily to scale. Moreover, in the figures, like-referenced numerals designate corresponding parts throughout the different views.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of the invention is thereby intended. It should be further appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

Figure 1:
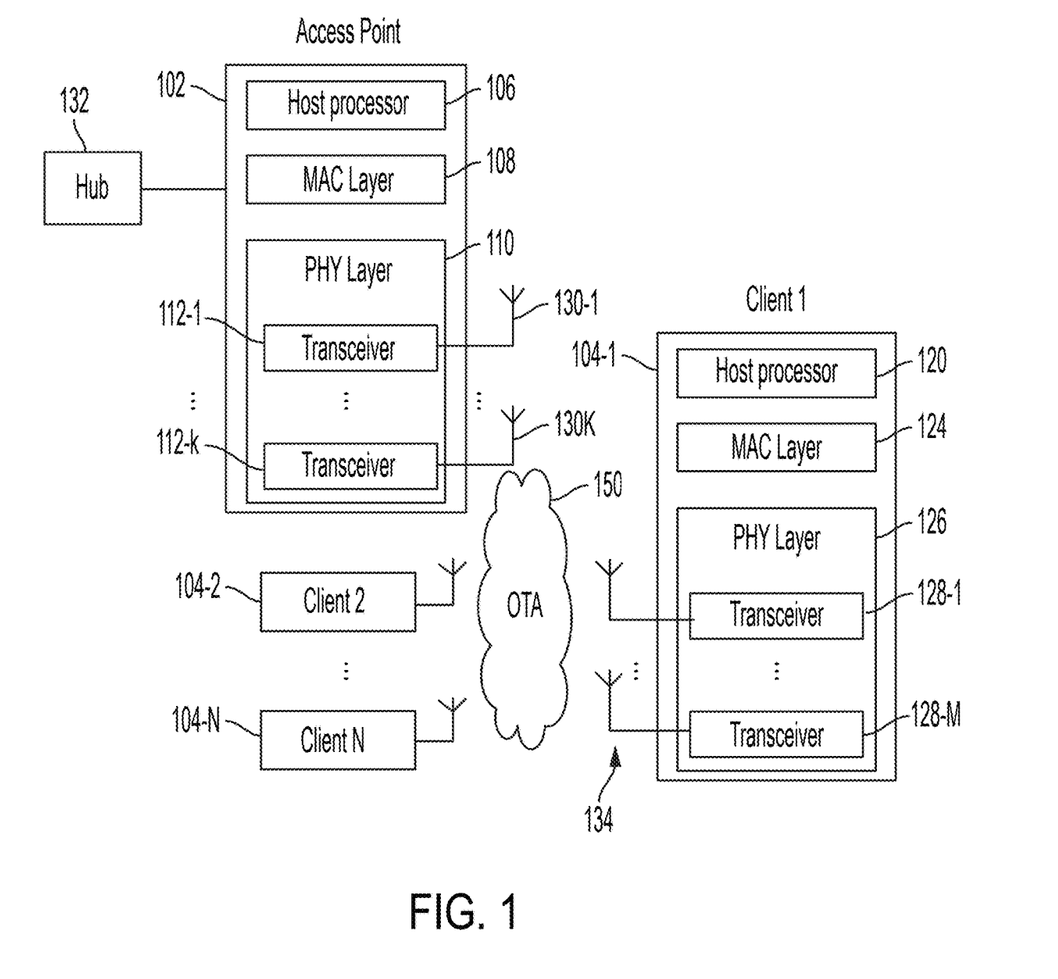
FIG. 1 illustrates a wireless communication network, according to some embodiments.

FIG. 1 illustrates a wireless communication network, according to some embodiments. In some embodiments, a wireless communication network 100 (e.g., WLAN) may facilitate communications between one or more access point (AP) device (e.g., 102) and one or more client devices (e.g., 104-1, 104-2, . . . 104-N). Each of the AP and client devices may be configured to receive or transmit frames (packets) from/to another device (e.g., AP or client devices) via over the air (OTA) medium (e.g., 150). These communication devices may be communicating with each other in a communication protocol, e.g., IEEE 802.11, or other suitable wireless protocols.

As shown in FIG. 1, AP device 102 may include one or more antennas (e.g., 130-1, . . . 130-K) configured to transmit or receive radio frequency (RF) signals to/from other devices in the wireless communication network 100. AP device 102 may include a physical layer 110, a MAC layer 108, and a host processor 106, which are configured to generate or process RF signals in lower to upper network layers, respectively. For example, PHY 110 may be configured to implement physical layer functions. PHY 110 may also include one or more transceivers (e.g., 112-1, . . . 112-K) configured to convert between baseband signals and RF signals, where RF signals are transmitted or received via the one or more antennas, e.g., 130-1, . . . 130-K. In a non-limiting example, in 802.11, PHY 110 may be configured to receive wireless frames, e.g., MPDU (MAC protocol data unit) from the MAC processor, remove the preamble and PHY header and extract the baseband signals. Similarly, PHY 110 may add preamble and PHY header to the baseband signals to generate wireless frames (packets), e.g., MPDUs, for passing to the MAC layer.

In FIG. 1, the MAC 108 may be configured to implement MAC layer functions including processing frames (packets) received from the PHY layer and converting to data frames for upper layer(s), or vice versa. For example, in 802.11, the MAC 108 may extract MSDUs (MAC service data unit) payload encapsulated in the frame body of MPDUs for the upper layers, where MPDUs are received from the PHY layer. Similarly, MAC 108 may receive MSDUs from upper layers and convert them to MPDUs for the PHY layer. Host processor 106 may be coupled to MAC 108 and PHY 110 to process data via respective layers. Host processor 106 may also be configured to implement one or more applications and transmit/receive data to/from MAC 108.

As shown in FIG. 1, each of the components, e.g., host processor 106, MAC 108, PHY 110, as well as transceivers (112-1, . . . 112-K) may include circuitry, e.g., one or more integrated circuits (ICs). Thus, one or more functions of MAC and PHY layers may be implemented in hardware. Alternatively, and/or additionally, one or more functions of MAC and PHY layers may be implemented in software, e.g., via executing programing instructions (e.g., stored in memory). For example, each of the MAC 108 and PHY 110 may include one or more processors, e.g., CPUs, to execute programming instructions in a memory.

With further reference to FIG. 1, AP device 102 may be connected to a hub 132 (e.g., a wired router, a modem) which provides the Internet services (e.g., via an ISP). AP device 102 may provide Internet, via hub 132, to one or more client devices (e.g., 104-1, 104-2, . . . 104-N) that are connected to the AP device wirelessly, e.g., via OTA medium 150. Each of the client devices may have a similar configuration as the AP device 102. For example, client device 104-1 may include a host processor 120, a MAC layer 124, a PHY layer 126.

Similar to AP device 102, a client device (e.g., 104-1, 104-2, . . . 104-N) may include one or more antennas (e.g., 134) configured to transmit or receive RF signals to/from other devices in the wireless communication network 100. PHY layer 126, MAC layer 124, and host processor 120 may be configured to generate or process RF signals in lower to upper network layers, respectively. For example, PHY layer 126 may be configured to implement physical layer functions. PHY layer 126 may include one or more transceivers (e.g., 128-1, . . . 128-M) configured to convert between baseband signals and RF signals, where RF signals are transmitted or received via the one or more antennas 134. In a non-limiting example, in 802.11, PHY layer 126 may receive wireless frames, e.g., MPDUs from the MAC layer 124, remove the preamble and PHY header and extract the baseband signals. Similarly, PHY 126 may add preamble and PHY header to the baseband signals to generate wireless frames (packets), e.g., MPDUs, for passing to MAC layer 124.

In FIG. 1, MAC layer 124 may be configured to implement MAC layer functions including processing frames (packets) received from the PHY layer and converting to data frames for upper layer(s), or vice versa. For example, in 802.11, MAC layer may extract MSDUs payload encapsulated in the frame body of MPDUs for the upper layers, where MPDUs are received from the PHY layer. Similarly, MAC layer 124 may receive MSDUs from the upper layers and convert them to MPDUs for the PHY layer. Host processor 120 may be coupled to the MAC layer 124 and PHY layer 126 to process data via respective layers. Host processor 120 may also be configured to implement one or more applications and transmit/receive data to/from MAC layer 124.

Similar to AP device 102, each of the components in a client device, e.g., host processor 120, MAC layer 124, PHY layer 126, as well as transceivers (128-1, . . . 128-M) may include circuitry, e.g., one or more integrated circuits (ICs). Thus, one or more functions of MAC and PHY layers may be implemented in hardware. Alternatively, and/or additionally, one or more functions of MAC and PHY layers may be implemented in software, e.g., via executing programing instructions (e.g., stored in memory) by MAC layer 124, PHY layer 126, host processor 120, or any other suitable processors. Client devices 104-2, . . . 104-N may each have a similar configuration as client device 104-1. Although one AP device 102 is shown in FIG. 1, it is appreciated that there can be multiple AP devices in the wireless communication network 100. Further, any suitable number of client device may be possible as supported in current or later developed protocols.

Any device in the wireless network 100 (e.g., 102, 104) may use channel and noise estimation in decoding data that is received from the OTA medium. Noise estimation and channel estimation are commonly used in communication systems to demodulate and decode the received signal. Examples of noise estimation include estimating the noise which may be introduced in the communication channel and use the estimated noise to correct the received signal to be able to decode data correctly. Examples of channel estimation include estimating the channel characteristics in the communication channel and use the estimated channel characteristics to correctly decode received signal from the OTA medium.

In some embodiments, noise and channel estimation can be performed using training symbols. For example, the transmitter may send training symbols, e.g., preambles in a wireless frame. In some embodiments, the preambles may include more than one symbol, and the sequence on these symbols can be identical, e.g. non-high-throughput LTF (L-LTF). The signal in L-LTF may include 0 or 1, which may be known by the receiver. At the receiver, the actually received preambles may be used to estimate the noise and channel.

In a wireless communication network, each device may include multiple antennas such as shown in FIG. 1. In some examples, the signal transmitted on different antennas at a transmitter device (transmitter antennas) may be added with different delays (cyclic shift diversity, CSD) under some wireless protocols. These delays may be intended to differentiate among different transmitter antennas. At the receiver, the signal transmitted from multiple transmitter antennas will be added together. Thus, the received signal for the preamble symbols (e.g. L-LTF) will include more than one copy of the signal, with each copy having a certain delay in the time domain that may be different from other copies.

In wireless communication having multiple subcarriers (e.g., frequency) in a wireless channel, channel smoothing operation may be used, where the channel response for one subcarrier may be combined with the channel response(s) of neighbouring subcarriers to reduce the noise impact. In some examples, moving a smoothing window along the subcarrier axis allows an estimated raw (not smoothed) channel on a subcarrier to be added together with certain number of neighbouring subcarriers in the window, and then averaged to get the averaged channel. In other examples, a filter such as a finite impulse response (FIR) filter can be used to obtain the smoothed channel response.

It is appreciated that delay in time domain results in different phases on different subcarriers (frequency domain). With different delays (e.g., delays due to CSDs) added on different copies of the signal for a symbol, the channel smoothing will be impacted due to the different phases on each subcarrier. This may be further illustrated with examples described below.

Denoting the received frequency domain signal at preamble symbol m on subcarrier k on receiver antenna j by $y_{m,j}[k]$. The signal $y_{m,j}[k]$ can be expressed as:

$$y_{m,j}[k] = \sum_{i=0}^{N_{tx}-1} x[k] e^{-j2\pi t_{ij} k} h_{ij}[k] + n_{m,j}[k] \quad (1)$$

where $N_{tx}$ is the number of transmitter antennas, $x[k]$ is the signal transmitted on subcarrier k, $t_{ij}$ is the delay of the signal transmitted from antenna i and received at receiver antenna j. $t_{ij}$ may depend on the distance between antenna i and antenna j. $h_{ij}[k]$ is a complex scaling number that represents the channel from transmitter antenna i to receiver antenna j on subcarrier k. The channel h may depend on antenna characteristics, e.g., physical location of the antenna(s). $n_j[k]$ is the noise, which may be a complex number that represents added noise at the receiver side, e.g., gaussian noise at receiver antenna j on subcarrier k.

Raw channel estimation may be performed to estimate channel h using preamble symbols (e.g., L-LTF, usually defined by the wireless protocols). $x[k]$ represents the preamble sequence (known by the receiver), which may have one or more preamble (training) symbols. $y_{m,j}[k]$ represents the received frequency domain signal at preamble symbol m on subcarrier k on receiver antenna j. The channel h can be estimated based on one of the training symbols, or a combination of two or more symbols, such as:

$$\hat{h}_j[k] = \frac{1}{N}\sum_m y_{m,j}[k] \times x[k] = \frac{1}{N}\sum_m \left( \sum_{i=0}^{N_{tx}-1} e^{-j2\pi t_{ij} k} h_{ij}[k] + n_{m,j}[k] \right) \quad (2)$$

where N is the number of preamble (training symbols).

Channel smoothing can be performed on the estimated channel, for example, $$\tilde{h}_j[k] = \sum_{l=-L_0}^{L_1} \hat{h}_j[k-l] e^{j2\pi \Delta t_j (k-l)} \times c_l \quad (3)$$

where $L_0$ and $L_1$ are number of subcarriers on two sides of the subcarrier k to be smoothed, $\Delta t_j$ is an estimated timing offset at receiver antenna j, and $c_l$'s are smoothing coefficients. If $N_{tx}=1$ (i.e., the delay will be zero) or $t_{ij}$ are the same for different transmitter antenna i, the above smoothing operation can reduce the noise variance and thus improve the channel estimation performance. However, for cases with $N_{tx}>1$ and $t_{ij}$ being different for different transmitter antenna i (e.g., the delay caused by using CSD), then phase $e^{-j2\pi(t_{ij}-\Delta t_j)k}$ on subcarrier k for different i will be added and smoothed as well, resulting in inaccurate phases on the smoothed channel response, thus impacting the accuracy of channel estimation and degrading the performance decoding in the communication network.

The inventors have acknowledged and appreciated that delays of transmitter antennas (e.g., due to CSD) may be treated as noise in estimating channel at the receiver, resulting in inaccurate estimation. However, it would be difficult to remove the noise from the estimation because the number of transmitter antennas and whether CSD is used are unknown to a receiver. Accordingly, the inventors have developed techniques that are provided to determine whether the channel smoothing should be performed or raw channel estimation should be used based on the performance of estimated noise before and after the channel smoothing.

Figure 2:
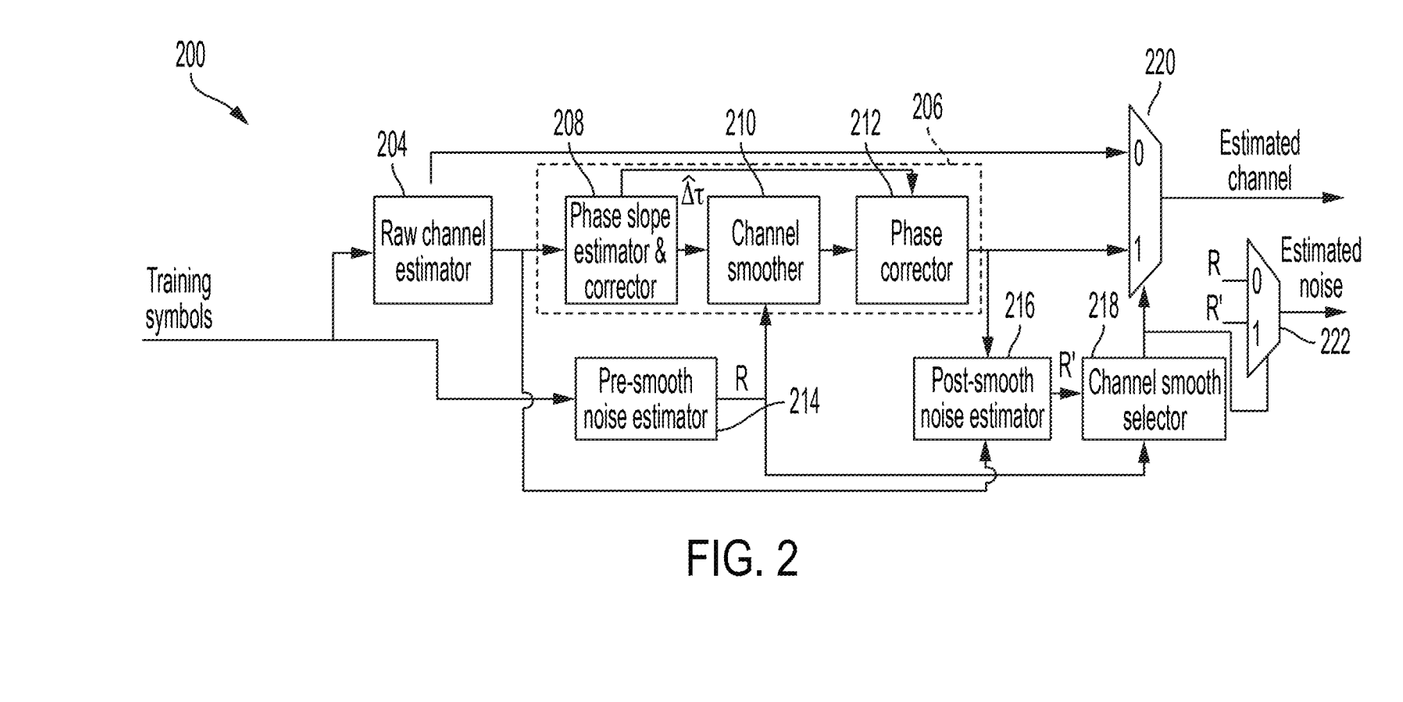
FIG. 2 is a diagram of an example system for channel and noise estimation, according to some embodiments.

FIG. 2 is a diagram of an example system 200 for channel and noise estimation, according to some embodiments. System 200 may be implemented in any of the devices shown in FIG. 1. For example, system 200 may be implemented in the PHY layer of a device. In some embodiments, system 200 may include a channel estimator 204 configured to provide raw (pre-smoothing) estimated channels based on one or more training symbols received from a wireless channel. System 200 may further include a channel smoother 206 coupled to the channel estimator 204 and configured to smooth the pre-smoothing estimated channels to provide post-smoothing estimated channels. System 200 may include a pre-smoothing noise estimator 214 configured to provide pre-smoothing estimated noise based on one or more training symbols; and a post-smoothing noise estimator 216 configured to provide post-smoothing estimated noise based on the post-smoothing estimated channels. The system may determine whether the pre-smoothing channel estimation and pre-smoothing noise estimation be used, or post-smoothing channel estimation and post-smoothing noise estimation be used.

In making the determination, system 200 may include a channel smooth selector 218 configured to provide a selection signal based on the pre-smoothing estimated noise and the post-smoothing estimated noise, respectively provided by the pre-smoothing noise estimator 214 and post-smoothing noise estimator 216. In some embodiments, the channel smooth selector 218 may include a comparator configured to compare the pre-smoothing estimated noise power and post-smoothing estimated noise power, and provide the selection signal based on the comparison. For example, if the post-smoothing estimated noise power has a lower value, the comparator may provide the selection signal (e.g., value 1) indicating that the post-smoothing estimated noise and post-smoothing estimated channels be selected. Otherwise, the comparator may provide the selecting signal (e.g., value 0) indicating that the pre-smoothing estimated noise and pre-smoothing estimated channels be selected.

System 200 may further include a multiplexer (e.g., 220, 222) configured to, in response to the selection signal, select estimated channels and estimated noise respectively from the pre-smoothing estimated channels and the pre-smoothing estimated noise or respectively from the post-smoothing estimated channels and the post-smoothing estimated noise. For example, if the selection signal has a value 0 in the above example, the multiplexer may select the estimated channels and noise respectively from the pre-smoothing estimated channels and the pre-smoothing estimated noise. With further reference to FIG. 2, the selected estimated channels and the selected estimated noise from the multiplexer may be provided to a decoder to decode wireless signals from the wireless channel.

Now, various components in FIG. 2 are further described in detail. In some embodiments, the various components, e.g., boxes 204, 206, 214, 216, may operate in a frequency domain. Thus, system 200 may receive one or more training symbols and other signals in frequency domain, where the training symbols and frequency domain signals may be provided by a time to frequency converter, e.g., Fast Fourier Transform (FFT) unit. Although the examples that follow will be illustrated in frequency domain, it is appreciated that system 200 may alternatively operate in time domain.

In some embodiments, the received signal at preamble symbols (e.g. L-LTF) may be received in frequency domain. In non-limiting examples, for signal fields such as L-LTF, there are two identical symbols for transmission. Denote the received training symbols in frequency domain for subcarrier k and antenna j by $y_{j,0}[k]$ and $y_{j,1}[k]$, the pre-smoothing noise samples at subcarrier k for each antenna j can be estimated by:

$$\hat{n}_j[k] = y_{j,0}[k] - y_{j,1}[k] \qquad (4)$$

These noise samples can be used to estimate the noise covariance R, which can be calculated in pre-smoothing noise estimator 214. In some examples, noise covariance may include a matrix having the dimension as the number of antennas in the receiver. If there are n antennas, then the covariance will be a n×n matrix. Each non-diagonal element in the matrix, e.g., $R_{j_0 j_1}$ may represent a correlation of noise received at multiple antennas at receiving side, e.g., receiver antenna $j_0$, $j_1$. The diagonal elements in the matrix may each represent the noise power at each antenna, e.g., $R_{j_0 j_0}$ (representing noise power at antenna $j_0$).

In some examples, an element (e.g., $j_0$th row and $j_1$th column) of noise covariance matrix R can be calculated by:

$$R_{j_0 j_1, l} = \frac{1}{2} \frac{1}{|K_l|} \sum_{k \in K_l} \hat{n}_{j_0}[k] \times conj(\hat{n}_{j_1}[k]) \qquad (5)$$

where $j_0$ and $j_1$ are receiver antenna indexes, and $K_l$ is the set of subcarriers to average the noise, where l stands for the channel index (each channel having a bandwidth, e.g., 20 MHz or other suitable values). Conj means conjugate. If there are two antennas, the size of matrix R should be 2×2, and R has four elements. The size of $K_l$ stands for the number of available subcarriers in a channel, e.g., 20 MHz channel bandwidth (BW) for L-LTF. In non-limiting examples, $K_l$ for a 20 MHz channel with 321.4 KHz spacing between subcarriers may be 52 (not counting zero-value subcarriers) or any other suitable values. In some examples, there can be a lower limit for the estimated noise power, e.g. $R_{jj,l} = \min\{R_{jj,l}, P_{noise_{LB}}\}$, where $P_{noise_{LB}}$ can be a configured or predefined value. For example, $P_{noise_{LB}}$ may have a value greater than 0 such that the noise power is greater than 0.

In some embodiments, post-smoothing noise estimator 216 may be configured in a similar manner as pre-smoothing noise estimator 214, with the difference being that the noise samples for the post-smoothing noise estimator are from the post-smoothing estimated channels as opposed to the training samples in pre-smoothing channel estimator. If the output of raw (pre-smoothing) channel estimator 204 is denoted by $\hat{h}_j[k]$ and the output of channel smoother 206 is denoted by $\tilde{h}_j[k]$, then the post-smoothing noise samples can be estimated based on the difference between the post-smoothing channel estimation and the pre-smoothing channel estimation, as:

$$\Delta \hat{n}'_j[k] = \hat{h}_j[k] - \tilde{h}_j[k] \qquad (6)$$

Then the $j_0$th row and $j_1$th column element of noise covariance matrix can be calculated in a similar manner as in Eq. (5), by:

$$R'_{j_0 j_1, l} = 2 \times \frac{1}{|K_l|} \sum_{k \in K_l} \Delta \hat{n}'_{j_0}[k] \times conj(\Delta \hat{n}'_{j_1}[k]) \qquad (7)$$

Similar to the pre-smoothing noise estimation, the size of $K_l$ may be 20 MHz channel BW for L-LTF, e.g., 52, or any other suitable values. In some examples, there can be a lower limit for the estimated noise power, e.g. $R'_{jj,l} = \min\{R'_{jj,l}, P_{noise_{LB}}\}$, where $P_{noise_{LB}}$ can be a configured or predefined value.

With further reference to FIG. 2, channel smooth selector 218 may include a comparator that compares the pre-smoothing noise covariance matrix R and the post-smoothing noise covariance matrix R'. In some scenarios, signals received at the receiver from a single transmitter antenna may yield better smooth results than from multiple transmitter antennas because, in the latter case, the channel smoothing may result in inaccurate results. In these cases, the noise power estimated in post-smoothing noise estimator may be larger than the noise power estimated in pre-smoothing noise estimator. As described above and further herein, the channel smooth selector (e.g., 218) may compare the noise power estimated in the pre-smoothing noise estimation and post-smoothing noise estimation, and select one with the smaller noise power. As the receiver device does not know whether the received signals are sent from one transmitter antenna or multiple transmitter antennas at the transmitter end, a larger noise power from noise covariance post-smoothing may indicate the signals are likely from multiple transmitter antennas, and thus, channel smoothing may not be preferred.

In non-limiting examples, channel smooth selector 218 may compare the noise power of pre-smoothing noise covariance matrix R and post-smoothing noise covariance matrix R', whereas the noise power is the sum of noise power at all of the receiver antennas, such as as $\Sigma_j R_{jj,l}$ for pre-smoothing estimation and $\Sigma_j R'_{jj,l}$ for post-smoothing estimation. Lower noise power may indicate better performance. In some embodiments, the comparator 218 may compare $\Sigma_j R_{jj,l} \times T_{smooth}$ and $\Sigma_j R'_{jj,l}$, to determine whether the pre-smoothing estimated noise covariance and non-smoothed raw estimated channels will be selected or not, based on which noise power is smaller. For example, if $\Sigma_j R_{jj,l} \times T_{smooth} < \Sigma_j R'_{jj,l}$, the pre-smoothing estimated noise covariance and non-smoothed raw estimated channels will be selected. In such case, selection signal may be set to value 0. Otherwise, the smoothed channel response and the post-smoothing estimated noise covariance will be selected. In such case, select signal may be set to value 1.

The parameter $T_{smooth}$ may be any non-negative weight, which can be configured or predefined to have a suitable value. For example, $T_{smooth}$ with a smaller value may indicate that pre-smoothing estimation is preferred to post-smoothing estimation. For example, if the device knows there are multiple transmitter antennas, smoothing may not be preferred, and thus, a smaller $T_{smooth}$ value may be set. Otherwise, if the device knows the transmitter has a single antenna, a higher $T_{smooth}$ value may be set in favor of using post-smoothing estimation.

In some embodiments, the channel selection performed by comparator 218 and multiplexer(s) 220, 222 may be performed only on the primary channel, e.g., one 20 MHz, and the results can be applied to all other 20 MHz channels if any (if the channel bandwidth is larger than 20 MHz, e.g., 40 MHz, 80 MHz, etc.). Alternatively, each 20 MHz channel can perform its own channel and noise selection.

Returning to box 204 in FIG. 2, raw (pre-smoothing) channel estimation may use one or more training symbols. In some examples, the training symbols may be signals in frequency domain, e.g., multiple sets of training symbols each set associated with a respective subcarrier of a plurality of subcarriers. Accordingly, the raw estimated channels may include multiple estimated channels each associated with a respective subcarrier. An estimated channel may be provided based at least in part on one or more training symbols associated with the respective subcarrier. An estimated channel for subcarrier k can be expressed as:

$$\hat{h}_j[k] = \frac{1}{2}\sum_{m=0}^{1} y_{j,m}[k] \times [k] \qquad (8)$$

where x[k] stands for the transmitted training sequence, e.g., preamble sequence L-LTF, comprising one or more training (preamble) symbols. y[k] stands for the received symbols corresponding to the training symbols. In this case, two received training symbols in frequency domain signal $y_{j,0}[k]$ and $y_{j,1}[k]$ are used for channel estimation.

Returning to box 206, similar to pre-smoothing channel estimation, the post-smoothing channel estimation may include a plurality of estimated channels each associated with a respective subcarrier (frequency) k, where each post-smoothing estimated channel is provided based at least in part on a combination of two or more pre-smoothing estimated channels. For example, for a subcarrier k, the post-smoothing estimated channel may be a combination of pre-smoothing estimated channels in the neighborhood of subcarrier k. Denoting the raw (pre-smoothing) estimated channel described above as $\hat{h}_j[k]$, then the post-smoothing channel responses $\tilde{h}_j[k]$ may be expressed by $$\tilde{h}_j[k] = \sum_{l=-L_0}^{L_1} \hat{h}_j[k-l] \times c_l. \qquad (9)$$

In this example, channel smoothing for subcarrier k is performed on the neighboring subcarrier [k–$L_0$, k+$L_1$] pre-smoothing channel estimation. $c_l$ can be respective weights for the subcarriers and can have any suitable values. For example, for a neighborhood of three subcarriers, if c is 1/3, then the smoothing operation in Eq (9) is an averaging operation.

In some embodiments, channel smoothing in channel smoother 206 may include phase slope correction, which considers the delay of signals (time offset) in time domain (translated to phase in frequency domain). Time delay (offset) may be attributed to a variety of factors such as CSD added on some transmitter antennas, propagation delay of signals over the air, and the time synchronization error between the transmitter antenna(s) and receiver antenna(s). Channel smoother 206 may include a phase slope estimator and corrector 208 followed by channel smoother 210, which is followed by a phase corrector 212. In estimating and correcting phase slope, box 208 may estimate a phase based on the pre-smoothing estimated channels; remove the phase from the pre-smoothing estimated channels to provide phase removed pre-smoothing estimated channels. Thus, channel smoother 210 performs channel smoothing over the phase removed pre-smoothing estimated channels. Subsequently, phase corrector 212 may add back the phase to the smoothed estimated channels from channel smoother 210.

In the example above, phase slope estimator and corrector 208 attempts to remove the phase slope caused by the time offset (delay). This may include two steps: estimate the phase and correct the pre-smoothing channel estimation by the estimated phase. Denoting the raw (pre-smoothing) estimated channel for subcarrier k described above as $\hat{h}_j[k]$, then the phase can be estimated in box 208. For example, the estimated phase may be expressed in a time offset which can be estimated based on at least two pre-smoothing estimated channels at different subcarriers, such as, by:

$$\hat{\Delta t}_j = \frac{\text{phase}\left(\sum_l \hat{h}_j[k_l] \times conj(\hat{h}_j[k_l'])\right)}{2\pi\Delta k} \qquad (10)$$

where $k_l$ and $k_l'$ are two subcarrier indexes for phase slope estimation, with $\Delta k = k_l' - k_l$.

Additionally and/or alternatively, the phase slope estimation may combine estimated time offsets from two or more receiver antennas:

$$\hat{\Delta t} = \frac{\text{phase}\left(\sum_j \sum_l \hat{h}_j[k_l] \times conj(\hat{h}_j[k_l']) \times e^{i2\pi\phi_j}\right)}{2\pi\Delta k} \qquad (11)$$

where $\Sigma_j(\ )$ is a sum over multiple receiver antennas. $\phi_j$ may be a predefined or configured value. In some examples, $\phi_j$ may have a 0 value. The estimated time offset will be used to remove the phase difference at different subcarriers. Thus, the phase removed pre-smoothing estimated channels provided by box 208 may be expressed as:

$$\hat{h}'_j[k] = \hat{h}_j[k] e^{j2\pi\hat{\Delta t}k} \qquad (12)$$

In box 210, the phase removed pre-smoothing estimated channel from box 208 may be smoothed in a similar manner as described above in Eq. (9), and expressed as:

$$\tilde{h}'_j[k] = \sum_{l=-L_0}^{L_1} \hat{h}'_j[k-l] \times c_l \qquad (13)$$

In box 212, the smoothed channel can be multiplied by $e^{-j2\pi\hat{\Delta t}k}$ to add the phase back to provide the post-smoothing estimated channels:

$$\tilde{h}_j[k] = \tilde{h}'_j[k] e^{-j2\pi\hat{\Delta t}k} \qquad (14)$$

With further reference to FIG. 2, in response to the selection signal provided by the channel smooth selector 218, multiplexer(s) 220, 222 may select the estimated channels and estimated noise respectively from pre-smoothing estimated channels and pre-smoothing noise estimation or respectively from post-smoothing estimated channels and post-smoothing noise estimation for subsequent decoding. Subsequent decoding using the selected estimated channels and estimated noise is further explained in an example in OFDM receiver.

Figure 3:
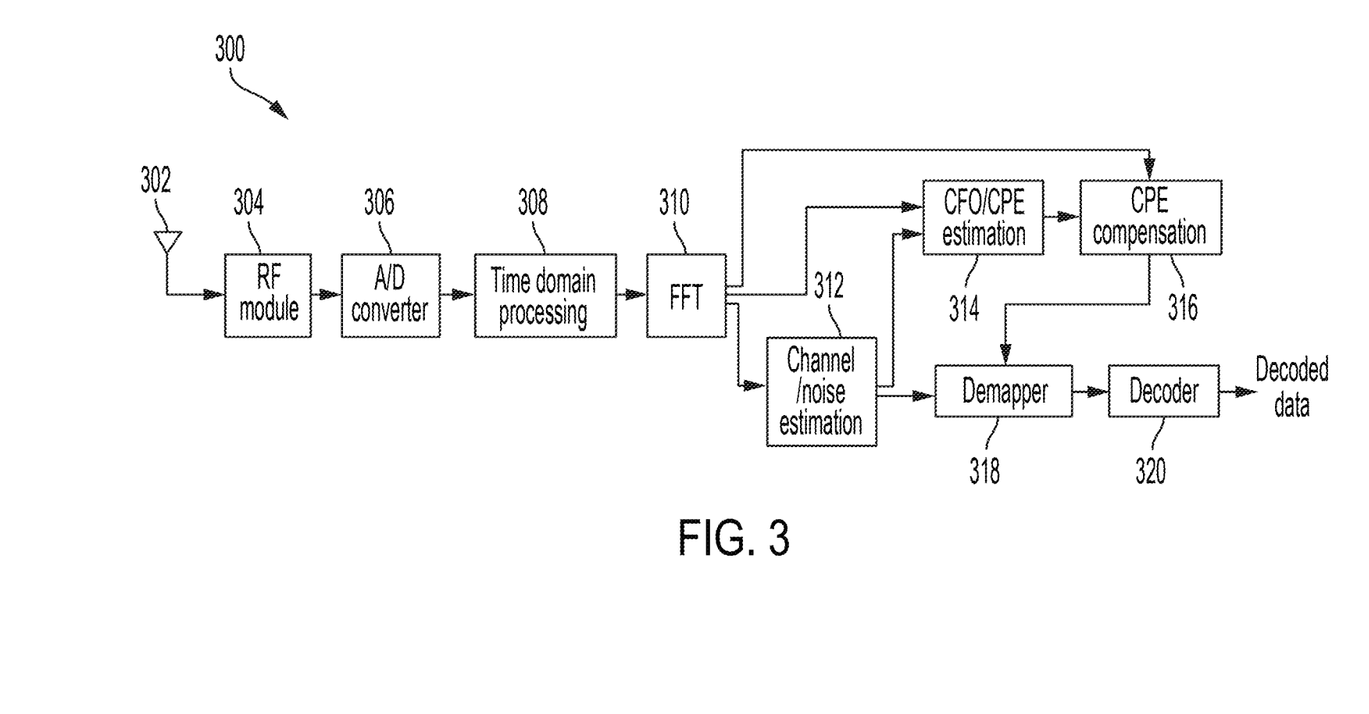
FIG. 3 is a diagram of an OFDM receiver that implements various embodiments of channel and noise estimation, according to some embodiments.

FIG. 3 is a diagram of an OFDM receiver 300 that implements various embodiments of channel and noise estimation, according to some embodiments. For example, channel/noise estimation 312 in OFDM receiver 300 may implement the example system 200 for channel estimation and noise estimation. As shown in FIG. 3, receiver 300 may additionally include an RF unit 304, an analog-to-digital (A/D) converter 306, a time domain processing unit 308, a time-to-frequency converter 310 (e.g., Fast Fourier Transforms (FFT) unit), a carrier frequency offset (CFO) estimation and/or CPE estimation unit 314, a CPE compensation unit 316, a demapper unit 318, and/or a decoder unit 320.

In some embodiments, the RF unit 304 may receive the wireless signal from one or more receiver antennas 302, and pass the signal to the A/D converter 306, which converts the analog signal to digital signal. Then the time domain processing unit 308 may perform the signal detection, timing synchronization and frequency synchronization for the digital signal. For example, a frame from a wireless channel may include continuous signals of symbols. Timing synchronization in time domain processing unit 308 may determine which field in the frame (packet) contain the training symbols (e.g., L-LTF) and extract the training symbols from the frame to be used for channel/noise estimation.

After the time domain processing unit 308, the signal will pass through the FFT unit 310, which converts the time domain signal to frequency domain signal. The channel/noise estimation unit 312 may implement the system 200 (FIG. 2) as described above and further herein to estimate the channel and noise using the training symbols. The estimated channel responses and noise covariance provided by system 200 (e.g., output of multiplexer(s) 220, 222 in FIG. 2) will be sent to the demapper unit 318 for signal demapping. Demapper unit 318 may use the estimated channels and noise, and based on received signal y, to determine the input for decoder unit 320.

With further reference to FIG. 3, CFO/CPE estimation unit 314 may use the received frequency domain signal to estimate the CFO and/or CPE. The estimated CPE will be used at CPE compensation unit to compensate the received data signal. The data signal after CPE compensation will be passed to the demapper unit 318, to perform demapping using the estimated channels. Then the demapped signal will be decoded in the decoder unit 320. Subsequent signals (e.g., L-SIG control signals, and data) in the wireless frame can be decoded in the decoder unit 320.

In the embodiments described in FIGS. 2 and 3, as training symbols may be provided in each of the wireless frames, the channel and noise estimation as implemented in box 312 (and system 200) may be performed frame by frame. For example, the estimated channels and noise may be obtained for each frame using one or more training symbols in the frame, and used for decoding remaining symbols in that frame. It is appreciated that channel and noise estimation as described in the present disclosure may also be performed in other suitable configurations.

Figure 4:
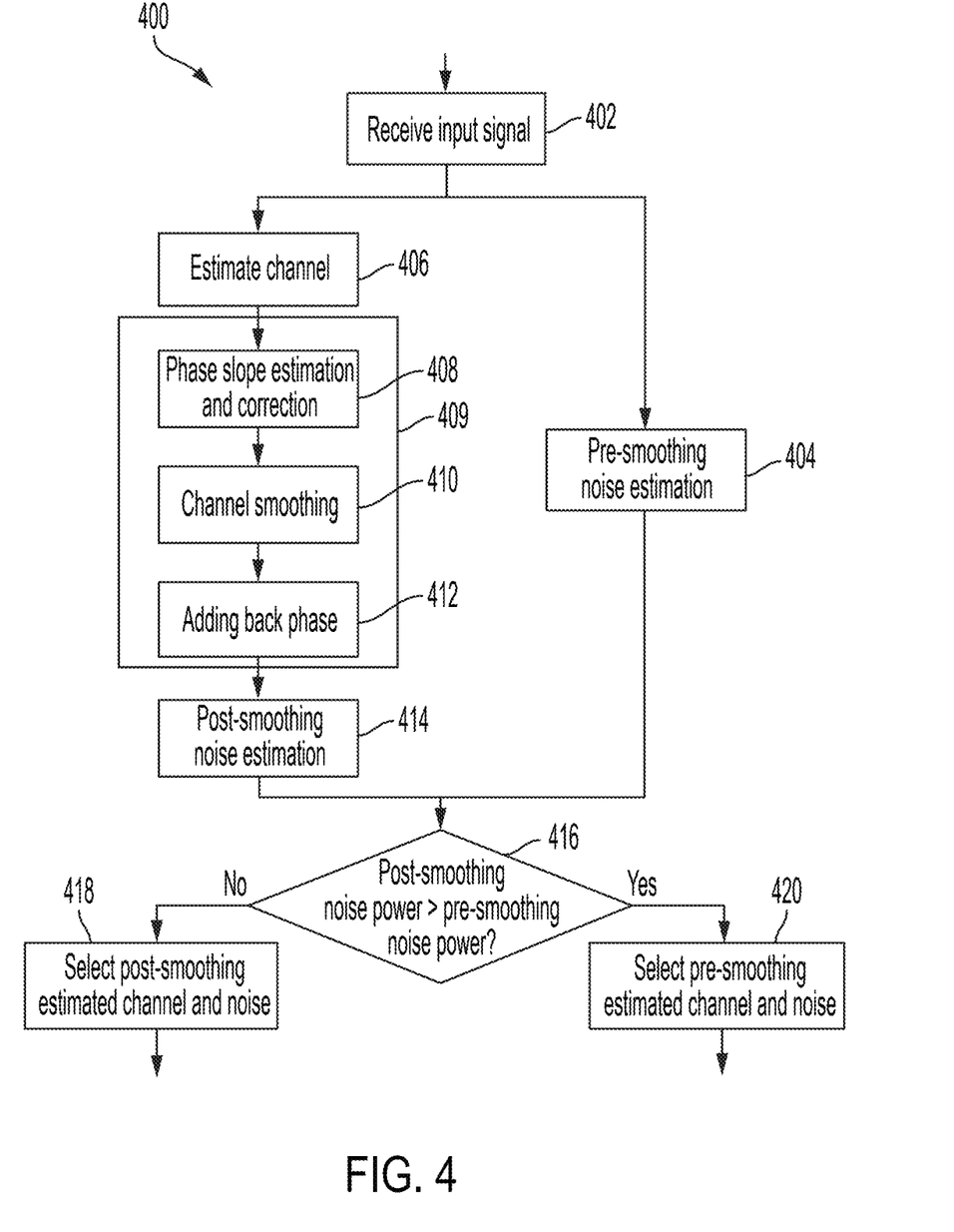
FIG. 4 is a flow diagram of an example process for estimating channel and noise, according to some embodiments.

FIG. 4 is a flow diagram of an example process 400 for estimating channel and noise, according to some embodiments. In some embodiments, process 400 may be implemented in system 200 (FIG. 2) and/or receiver 300 (FIG. 3). Method 400 may include receiving input signal, at act 402. For example, the received input signal may include a frame from a wireless channel containing training symbols as described above in FIGS. 2 and 3 and further herein. In some embodiments, the received signal may be in time domain or in frequency domain. Method 400 may further include providing estimated channels based on one or more training symbols, at act 406. For example, act 406 may be performed in a similar manner as described in the channel estimator 204 (FIG. 2). Method 400 may further include smoothing the estimated channels (from act 406) to provide post-smoothed estimated channels, at act 409. For example, act 409 may be performed in a similar manner as described in box 206 (FIG. 2).

Method 400 may include providing pre-smoothing estimated noise based on the training symbols, at act 404; and providing post-smoothing estimated noise based on the post-smoothing estimated channels (e.g., from act 409), at act 414. Act 404 may be performed in a similar manner as described in pre-smoothing noise estimator 214 (FIG. 2). Act 414 may be performed in a similar manner as described in post-smoothing noise estimator 216 (FIG. 2).

With further reference to FIG. 4, method 400 may generate a selection signal, at act 416, based on the performance of the post-smoothing estimated noise (from act 414) and that of the pre-smoothing estimated noise (from act 404). For example, in a similar manner as described in channel smooth selection 218 (FIG. 2), act 416 may compare the noise power of the pre-smoothing and post-smoothing estimated noise to generate a selection signal that indicates whether to select the channel estimation and noise estimation from the pre-smoothing channel/noise estimation or from post-smoothing channel/noise estimation. In response to the selection signal from act 416, method 400 may proceed to act 418 to select the post-smoothing estimated channels and the post-smoothing estimated noise, if the selection signal indicates that post-smoothing be selected. Otherwise, method 400 may proceed to act 420 to select the pre-smoothing estimated channels and the pre-smoothing estimated noise, if the selection signal indicates that pre-smoothing be selected. Following selection of channel and noise estimation, method 400 may proceed to decode wireless signals from the wireless channel using the selected estimated channels and the selected estimated noise.

With further reference to FIG. 4, act 409 may optionally including phase estimation (considering the time offset between the transmitter and receiver), and correcting the phase before smoothing the channel (at act 408) and after smoothing the channel (at act 412). In some embodiments, acts 408, 410, 412 may be performed in a similar manner as previously described in embodiments in FIG. 2. For example, the phase slope estimation at act 408 can be performed in a similar manner as described in phase slope estimator and corrector 208 (FIG. 2). Channel smoothing at act 410 may be performed in a similar manner as described in channel smoother 210 (FIG. 2). Adding back phase at act 412 may be performed in a similar manner as described in phase corrector 212 (FIG. 2).

Various embodiments described in the present disclosure provide advantages over existing system in that optimized channel and noise estimation can be obtained in view of inaccuracy caused by different delays in multi-antenna transmitters. Whereas it may be difficult for a receiver to know in advance the number of transmitter antennas at a transmitter end, the performances of pre-smoothing noise estimation and post-smoothing noise estimation are compared at the receiver. Based on the comparison, the pre-smoothing channel and noise estimation or post-smoothing channel and noise estimation may be selected for subsequent decoding in the receiver.

The various components and methods outlined herein may be implemented in hardware, e.g., one or more ICs, or coded as software that is executable on one or more processors that employ any one of a variety of operating systems or platforms. For example, any component in FIG. 2 may be implemented in hardware, software, or in combination. Additionally, such software may be written using any of numerous suitable programming languages and/or programming or scripting tools, and also may be compiled as executable machine language code.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This allows elements to optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/of" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

The invention claimed is:

1. An apparatus for communication in a wireless network, the apparatus comprising:
   a channel estimator configured to provide first estimated channels based on one or more training symbols received from a wireless channel;
   a channel smoother coupled to the channel estimator and configured to smooth the first estimated channels to provide second estimated channels;
   a first noise estimator configured to provide first estimated noise based on the one or more training symbols;
   a second noise estimator coupled to the channel smoother and configured to provide second estimated noise based on the second estimated channels;
   a multiplexer configured to, in response to a selection signal, select estimated channels and estimated noise respectively from the first estimated channels and the first estimated noise or respectively from the second estimated channels and the second estimated noise; and
   a decoder configured to decode wireless signals from the wireless channel using the selected estimated channels and the selected estimated noise.

2. The apparatus of claim 1 further comprising a selector configured to provide the selection signal based on the first estimated noise and the second estimated noise.

3. The apparatus of claim 2, wherein the selector comprises a comparator configured to:
   compare noise power of the first estimated noise and noise power of the second estimated noise; and
   provide the selection signal based on the comparison.

4. The apparatus of claim 1, wherein:
   the one or more training symbols are each received at a respective subcarrier of a plurality of subcarriers of the wireless channel; and
   the first estimated channels are each associated with a respective subcarrier of the plurality of subcarriers and provided based at least in part on a subset of the one or more training symbols associated with the respective subcarrier.

5. The apparatus of claim 4, wherein the second estimated channels are each associated with a respective subcarrier of the plurality of subcarriers, wherein an estimated channel of the second estimated channels is provided based at least in part on a combination of two or more of the first estimated channels.

6. The apparatus of claim 5, wherein the respective subcarriers associated with the two or more of the first estimated channels are in a proximity of the respective subcarrier associated with the estimated channel.

7. The apparatus of claim 1, wherein the channel smoother is further configured to:
   estimate a phase based on the first estimated channels;
   remove the phase from the first estimated channels to provide phase removed first estimated channels; and
   smooth the first estimated channels to provide the second estimated channels by:
      smoothing the phase removed first estimated channels to provide third estimated channels; and
      adding the phase to the third estimated channels to provide the second estimated channels.

8. The apparatus of claim 1, wherein the apparatus is an orthogonal frequency-division multiplexing (OFDM) receiver.

9. A method for communicating in a wireless network, the method comprising:
   providing first estimated channels based on one or more training symbols received from a wireless channel;
   smoothing the first estimated channels to provide second estimated channels;
   providing first estimated noise based on the one or more training symbols;
   providing second estimated noise based on the second estimated channels;
   in response to a selection signal, selecting estimated channels and estimated noise respectively from the first estimated channels and the first estimated noise or respectively from the second estimated channels and the second estimated noise; and
   decoding wireless signals from the wireless channel using the selected estimated channels and the selected estimated noise.

10. The method of claim 9 further comprising:
    providing the selection signal based on the first estimated noise and the second estimated noise.

11. The method of claim 10, wherein providing the selection signal comprises:
    comparing noise power of the first estimated noise and noise power of the second estimated noise; and
    providing the selection signal based on the comparison.

12. The method of claim 9, wherein:
    the one or more training symbols are each received at a respective subcarrier of a plurality of subcarriers of the wireless channel; and
    the first estimated channels are each associated with a respective subcarrier of the plurality of subcarriers and provided based at least in part a subset of the one or more training symbols associated with the respective subcarrier.

13. The method of claim 12, wherein the second estimated channels are each associated with a respective subcarrier of the plurality of subcarriers, wherein an estimated channel of the second estimated channels is provided based at least in part on a combination of two or more of the first estimated channels.

14. The method of claim 13, wherein the respective subcarriers associated with the two or more of the first estimated channels are in a proximity of the respective subcarrier associated with the estimated channel.

15. The method of claim 9, wherein smoothing the first estimated channels to provide the second estimated channels comprises:
    estimating a phase based on the first estimated channels;
    removing the phase from the first estimated channels to provide phase removed first estimated channels;
    smoothing the phase removed first estimated channels to provide third estimated channels; and
    adding the phase to the third estimated channels to provide the second estimated channels.

16. The method of claim 9 further comprising:
    extracting the one or more training symbols from a wireless frame in the wireless channel in time domain; and
    converting the one or more training symbols from the time domain to frequency domain.

17. A receiver in a wireless network, in which signals are encoded on multiple subcarriers each associated with a respective carrier frequency, the receiver comprising:
    an radio frequency (RF) unit configured to receive an RF signal from an over-the-air (OTA) medium on the multiple subcarriers;
    an analog-to-digital (AD) converter configured to convert the received RF signal to a digital wireless frame;
    a channel estimator configured to provide first estimated channels based on one or more training symbols contained in the digital wireless frame;
    a channel smoother configured to smooth the first estimated channels to provide second estimated channels;
    a first noise estimator configured to provide first estimated noise based on the one or more training symbols;
    a second noise estimator configured to provide second estimated noise based on the second estimated channels;
    a multiplexer configured to, in response to a selection signal, select estimated channels and estimated noise respectively from the first estimated channels and the first estimated noise or respectively from the second estimated channels and the second estimated noise; and
    a decoder configured to decode the digital wireless frame using the selected estimated channels and the selected estimated noise.

18. The receiver of claim 17, wherein:
    the one or more training symbols are each received at a respective subcarrier of the multiple subcarriers; and
    the first estimated channels are each associated with a respective subcarrier of the multiple subcarriers and provided based at least in part on a subset of the one or more training symbols associated with the respective subcarrier.

19. The receiver of claim 18, wherein the second estimated channels are each associated with a respective subcarrier of the multiple subcarriers, wherein an estimated channel of the second estimated channels is provided based at least in part on a combination of two or more of the first estimated channels.

20. The receiver of claim 17 further comprising a selector configured to provide the selection signal based on comparing the first estimated noise and the second estimated noise.

* * * * *